Oct. 14, 1969  D. N. JACKLEY ET AL  3,472,699
SEAWATER BATTERY EMPLOYING NON-UNIFORM DISTRIBUTION
OF ELECTROLYTE ALONG BATTERY LENGTH
Filed April 10, 1968  3 Sheets-Sheet 1

INVENTORS.
DONALD N. JACKLEY
COLEMAN A. REISMAN
BY
MICHAEL F. OGLO
ROY MILLER
ATTORNEYS.

United States Patent Office 3,472,699
Patented Oct. 14, 1969

3,472,699
SEAWATER BATTERY EMPLOYING NON-UNIFORM DISTRIBUTION OF ELECTROLYTE ALONG BATTERY LENGTH
Donald N. Jackley, Belmont, and Coleman A. Reisman, Sherman Oaks, Calif., assignors to the United States of America as represented by the Secretary of the Navy
Filed Apr. 10, 1968, Ser. No. 720,090
Int. Cl. H01m 17/00
U.S. Cl. 136—100                                              4 Claims

ABSTRACT OF THE DISCLOSURE

A seawater battery is of the type in which seawater is flowed through interplate spaces along a row of battery plates, and in so doing serves as the electrolyte of the battery. The seawater is introduced into the lower ends of the interplate spaces from a lower manifold chamber adjoining the battery plate lower edges. It emerges from the upper ends of the interplate spaces and is collected in an upper manifold chamber along the battery plate upper edges. The seawater feed line opens into the lower manifold chamber at one of its ends. The exhaust port through which the seawater flows out of the upper manifold chamber is located in the corresponding end of that chamber. Transverse flow through interplate spaces is partially obstructed at both ends of the row of batteries. This obstruction is effected by sets of longitudinally extending (along direction of row of plates) masking strips. Four sets of strips are used. Two sets are disposed over the top battery plate edges at one and the other ends of the row. Another two sets are disposed over the bottom battery plate edges at one and the other ends of the row. Each set of strips consists of a plurality of individual masking strips mounted in lateral spaced relationship to each other and other structure. The individual masking strips are tapered in the direction toward the middle of the row of battery plates to provide longitudinally decreasing flow obstruction area in the direction toward the middle of the row.

BACKGROUND OF THE INVENTION

This invention relates to seawater batteries of the type in which there is a continuous flow of seawater electrolyte through the spaces between electrolyte plates. More particularly it relates to improvements in apparatus for modifying the distribution of electrolyte along the length of the battery to better utilize the battery active materials.

The experience with prior art seawater batteries has been that the active chemical agents have not been consumed at a uniform rate along the length of the battery. The seawater is fed through the interplate spaces of the battery by a manifold arrangement consisting of simple upper and lower longitudinal chambers formed between the top edges of the battery plates and the hull of the torpedo and the bottom edges of the battery plates and the hull of the torpedo. Seawater water is introduced and exhausted from these chambers by ports disposed adjacent to the ends of the chambers. This structure offers a considerable advantage of simplicity in the construction of a battery assembly for a torpedo.

There has been a keen search for ways of improving utilization of the battery active agents by modifying the distribution of electrolyte flow through the interplate spaces along the length of the battery. A variety of schemes have been tried. One attempted scheme consists of providing vanes and baffles across the manifold chambers and across the inlet passage to the manifold chamber. Another attempted scheme consists of exotic shaping of the cross section of the manifold chamber, as disclosed in the copending application of Donald N. Jackley entitled "Seawater Battery with Electrodes in Decreasing Passage Areas," Ser. No. 569,008, filed July 28, 1966, now Patent 3,388,003. In general, these prior attempts have been deemed short of optimal. One reason they were not felt optimal is that elaborate structures had to be built into the battery assembly. The resultant margin of improvement of battery performance was not enough to justify the added complexity and manufacturing costs. Another reason is that these schemes yielded more complex fluid dynamics within the distribution system. As the result of the complexity of the fluid dynamics further modifications to the upstream distribution passages were required, and this in turn added complexity to the battery assembly.

Also, it has been proposed that the above described approach of modifying the flow distribution be combined with a second basically different approach, the second approach being the varying of the flow rate of electrolyte through the battery during its operation. Examples of the latter approach include use of a regulating valve on the inlet scoop as disclosed in U.S. Patent 3,154,040 to W. E. Neubert entitled "Sea Water Battery Flow Regulation Valve," or use of electromechanical regulation as disclosed in U.S. Patent 3,012,087 to L. H. Van Billiard et al., entitled "Sea Water Batteries." It has been found that both the scheme of use of vanes and baffling and the scheme of shaping the manifold chambers (described as prior attempts in the last paragraph) do not function linearly under variations in flow rate. Thus, these schemes can only be optimized for one particular flow rate, providing less than an optimum distribution of the flow during periods in which the battery operates with different flow rates.

Accordingly, the objectives of the invention include:
(1) Provision of a seawater battery having an improved scheme for achieving an optimum distribution of electrolyte through the plate interspaces;
(2) Provision of a seawater battery in accordance with the first objective which is simple in construction;
(3) Provision of seawater battery in accordance with the first objective which results in "uncômplicated" fluid dynamics within the electrolyte distribution system; and
(4) Provision of a seawater battery in accordance with the first objective in which the scheme for achieving optimum distribution is linear in operation under variations in flow rate so that it can maintain optimum distribution when employed in a seawater system having variation in flow.

Other objects and many of the attendant advantages of this invention will be readily appreciated as it becomes better understood by reference to the description and accompanying drawing which follows.

DESCRIPTION OF PREFERRED EMBODIMENT

Figure 1:
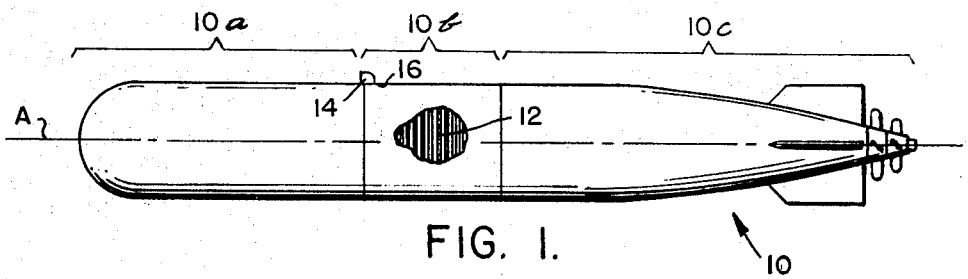
FIG. 1 is a side elevation of a torpedo which utilizes the seawater battery forming the subject of the invention.

Referring now to the drawing, FIG. 1 illustrates a torpedo hull 10 of a conventional form, composed of several separable longitudinal sections 10a, 10b and 10c. The subject of the invention is an improved torpedo propulsion battery 12, FIGS. 1 and 2, of the type adapted to be stored with its electrolyte compartment 13 in dry condition, and to be activated at the time of use by introducion of seawater thereinto. Battery 12 is shown as contained in the middle torpedo compartment hull section 10b. A scoop and inlet tube 14 opens into the top of the torpedo hull at the front edge of section 10b, forming the seawater supply line for the battery. After circulation of the seawater within battery 12, it is exhausted through an exhaust aperture 16 (best shown in FIG. 4), which opens into the torpedo hull behind scoop 14.

Figure 2:
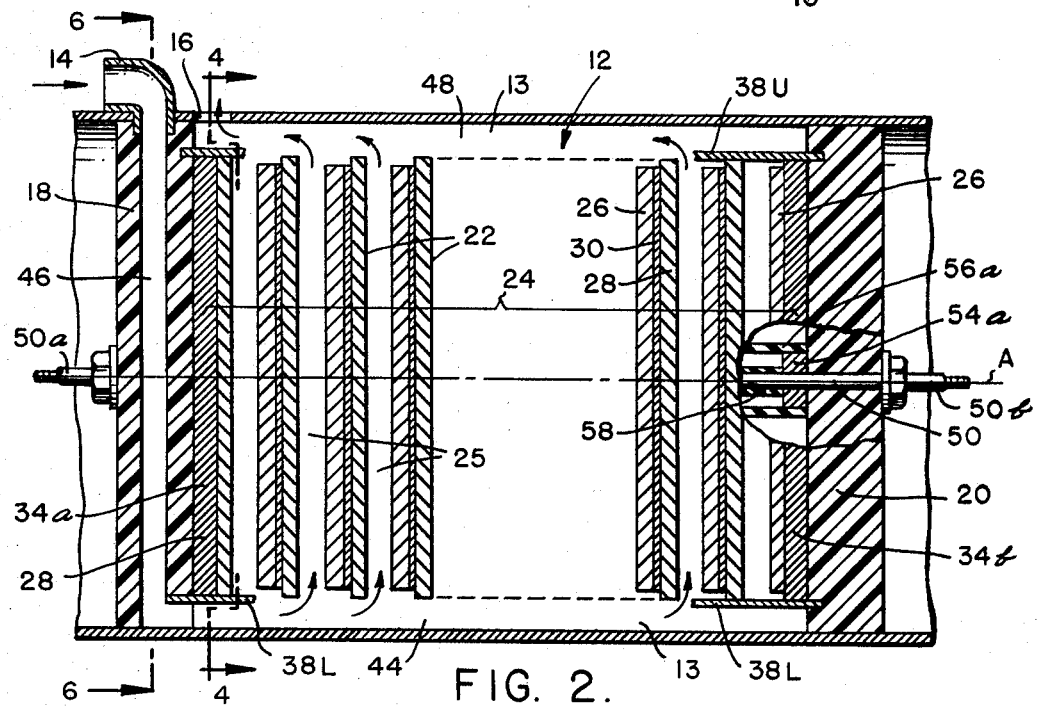
FIG. 2 is an enlarged central longitudinal section of the battery in which the battery electrode units are shown schematically taken along lines 2—2 in FIGS. 4 and 6.
Figure 3:
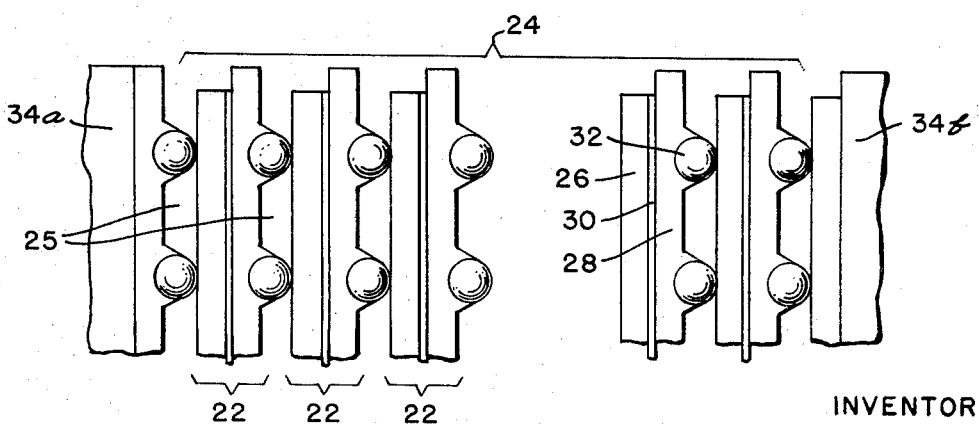
FIG. 3 is an enlarged detail showing the actual structure of the battery electrode units of FIG. 2.

Referring now to FIG. 2, a front bulkhead and inlet channel unit 18 and a rear bulkhead 20 are affixed adjacent the front and rear ends of hull section 10b. These bulkheads are made of a suitable dielectric material. A plurality of vertical electrode plate units 22 (shown schematically in FIG. 2 and in actual structure in FIG. 3) are arranged in a row 24 along the torpedo axis A, and in spaced relationship to one another so that transverse electrolyte spaces 25 are formed between each adjacent pair of units 22. Each electrode unit 22 consists of a positive plate element 26 of silver chloride (AgCl) at the front side of the unit and a negative plate element 28 of magnesium (Mg) at the rear side, formed into an integral assembly with a thin silver foil 30 therebetween. Spacing between the units is provided by small spacing beads 32 (FIG. 3 only) partially imbedded in the negative plate elements. The confronting positive plate element and the negative plate element of each pair of adjacent units defines a battery couple which produces an electromotive force when the electrolyte spaces 25 are filled with seawater. The forwardmost plate structure consists of an aluminum bus plate 34a having a negative plate element 28 affixed to its rear side. The rearwardmost plate structure consists of another aluminum bus plate 34b having positive plate element 26 affixed to its front side. Row 24 forms a so-called "battery pile" in which the couples are electrically in series.

Figure 4:
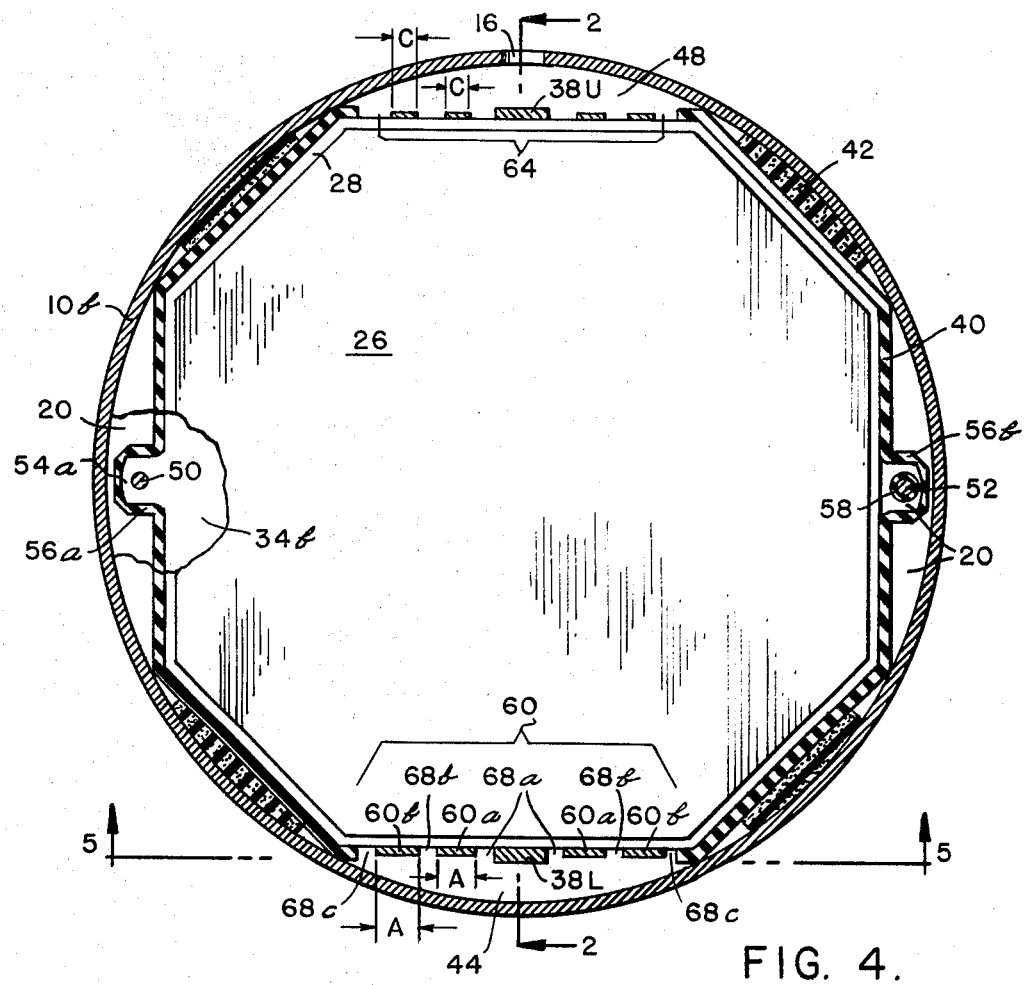
FIG. 4 is an enlarged section taken at line 4—4, FIG. 2.
Figure 5:
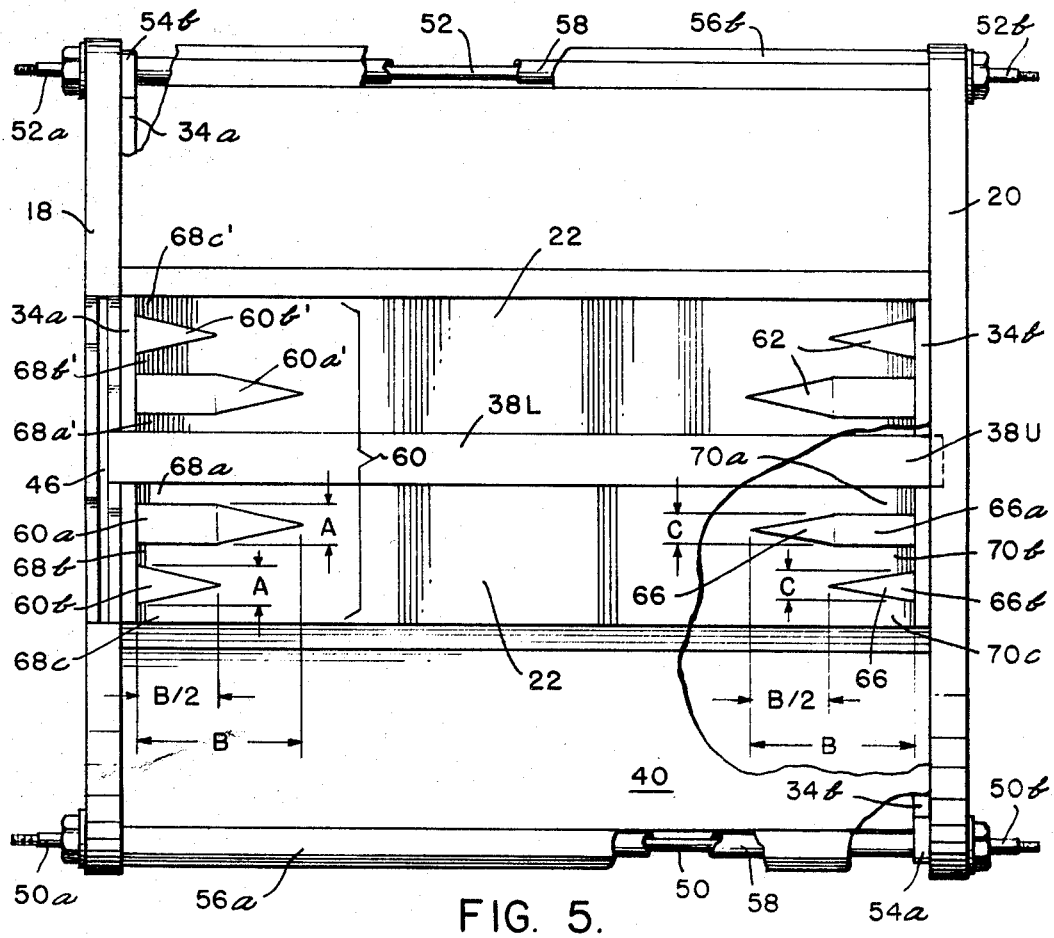
FIG. 5 is a bottom elevation of the battery plate subassembly taken along line 5—5 of FIG. 4, certain portions being cut away to show the masking strip structure present along the two upper edges of the plates.

As best shown in FIG. 4, the individual electrode plate elements 26 and 28 are squares having their corners cut to form diagonal edges, in order to better conform to the circular cross section of hull 10. The negative plate element 28 of each unit is slightly larger than the positive plate element 26. The row of electrode plate units 22 are integrally joined by a central reinforcement strip 38U running along the center of the top edge of the plates and another strip 38L running along the center of the bottom edge of the plates. This is best shown in FIG. 5 taken in conjunction with FIG. 4. Strips 38 are made of epoxy resin impregnated fiberglass. Their ends are cemented in place to the front and rear bulkheads 18 and 20. The inner face of each strip is cemented to the edges of the negative electrode plates 28 of the battery. As best shown in FIG. 5 taken in conjunction with FIG. 4, a dielectric covering 40 covers the diagonal and lateral edges of the row of electrode units. Covering 40 extends the full length of row 24, including the bus plates 34. Longitudinal wedges 42 (FIG. 4, only) of a suitable compressible material, such as sponge rubber, are jammed between the covering and the inner surface of hull 10b adjacent to each diagonal edges of the plate units. In mounting the battery within hull section 10b, the wedges 42 are compressed to form a rigid support for the row 24 of electric units.

Figure 6:
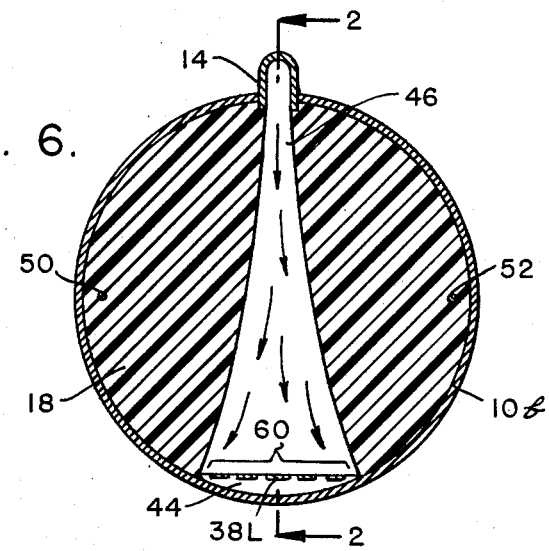
FIG. 6 is a reduced section taken at line 6—6, FIG. 2.

The space between the bottom edge of row 24 of plate units and confronting inner surface of the torpedo hull 10b defines a chordal cross-sectioned inlet manifold cavity 44 for conducting the seawater to the lower ends of spaces 25. The seawater is introduced into inlet manifold 44 through a diffusion passage 46, FIG. 6, formed in bulkhead unit 18. The upper end of diffusion passage 46 communicates with scoop 14. Similarly, the space between the top edge of row 24 of plate units and the confronting inner surface of hull 10b defines a chordal cross-sectioned manifold cavity 48. Cavity 48 collects the electrolyte from the top ends of spaces 25 and communicates it to seawater outlet aperture 16 where it is exhausted into the ambient stream.

A positive bus rod 50 (FIGS. 2 and 5) and a negative bus rod 52 (FIG. 4 and 5, only) extend along the length of battery through the chordal spaces at the starboard and port sides, respectively, of the battery plates. The positive bus rod 50 is electrically connected to an ear portion 54a formed on rear bus plate 34b. Dielectric covering 40 has longitudinal U-shaped channel portions 56a and 56b formed in its starboard and ports sides to protect the rods. Both ends of the rod project through the respective front and rear bulkheads forming the threaded outlet terminals 50a and 50b for power distribution fore and aft within the torpedo. The interior of channel section 56 is flooded during torpedo operation. For that reason an insulator sleeve 58 is provided about the expanse of the rods which extend through the channel 56a. Negative bus rod 52 is electrically connected to an ear portion formed on front bus plate 34a. The associated terminals, protective channeling, and insulation arrangement are like those of positive bus rod 50.

The electrode units 22 adjacent to each end of the battery have four sets of tapered masking strips 60, 62, 64 and 66 to partially obstruct the seawater flow through the underying inter-electrode spaces 25. Sets of strips 60 and 62 extend over the lower edges of the battery plates, set 60 extending rearwardly from front bulkhead unit 18 and set 62 extending forwardly from rear bulkhead 20. (Set 60 is shown in bottom elevation in FIG. 5 and in section in FIG. 4. Set 62 is shown in bottom elevation in FIG. 5.) Sets of strips 64 and 66 extend over the upper edges of the battery plates, set 64 extending rearwardly from front bulkhead unit 18 and set 66 extending forwardly from rear bulkhead unit 20. (Set 64 is shown in section in FIG. 4 and set 66 may be seen in the cut away portion of FIG. 5.)

The geometric configuration of all the sets of masking strips are alike, except for a difference in width between sets 60 and 62 over the bottom battery plate edges and sets 64 and 66 over the top edges. Set 60 is exemplary of the sets at the bottom edge. It consists of laterally symmetric arrangement about the center reinforcement member 38L in which two longer strips 60a, 60a' are disposed to one and the other side of member 38L and the two shorter strips 60b, 60b' disposed at the outer sides of the longer strips. The individual strips 60a, 60a', 60b, 60b' all have equal maximum widths A and are of this width at their respective base ends, i.e. the ends adjoining the front bulkhead. The longer strips 60a, 60a' have a length B. They are of uniform width, A, from their base end to the midpoint of their length and linearly taper to a point from the midpoint to their outer end. The shorter strips 60b, 60b' have a length B/2 and linearly taper to a point from their base end to their outer end. Strips 60a, 60a', 60b, 60b' are mounted with each of their base ends uniformly laterally spaced from adjoining structures. This forms a series of longitudinal spaces to 68a, 68a', 68b, 68b', 68c, 68c' which constitutes the passage area for electrolyte to enter the interplate spaces 25 underneath the set of strips. Note that the choice of geometry of the strips provides linearly increasing passageway area over the expanse of the set of strips. Set 66 (which is partially shown in the cut away portion of FIG. 5) is exemplary of the sets at the top edges. It consists of a symmetric arrangement of longer strips 66a and shorter strips 66b having the length of the same dimensions as the corresponding individual strips in the sets 62 and 64 at the lower edges. Also the tapers start and stop at the portions of their length. However, the strips at the upper edges are narrower, having a width C, as shown in FIG. 5. This results in greater passageway area in the corresponding longitudinal spaces 70a, 70a' (not shown), 70b, 70b' (not shown), 70c, 70c' (not shown), at the top edge. The individual strips of set 66, FIG. 4, likewise have a width C. The reason for providing the larger passage area at the top edges is to accommodate the effusion of gas bubbles which are generated along the active surfaces of the battery plates. Otherwise the volume of the gases could choke the flow through the interelectrode spaces. Exemplary dimensions follow for a successful embodiment of invention designed for use in a torpedo having 12¼" inside diameter, and in which the row 24 was 13" in length and contained two hundred and ten plate units 22. The length B of the longer masking strip 60a, 60a', 62a, 62a', 64a etc. was 2". The base end width B of the strips along the lower edges was 0.66" and the base end width of spaces 68 was 0.23". These dimensions yield initial base end obstruction of approximately 70% of the available electrolyte entry area into the bottom edge of the plate. (The available electrolyte entry area is the area between the lateral edges of center reinforcement member 38 and the confronting edges of dielectric coverings 40.) The percentage of obstruction linearly decreases to zero percent at distance B. The base end width C of the strips along the upper battery plate edges was 0.353" and the base end widths of longitudinal spaces 70 was 0.43", which yields initial base end obstruction of approximately 35% of the available electrolyte egress area. The individual masking strips are made of a flat epoxy impregnated fiberglass laminate and are cemented in place.

In operation, the torpedo is suitably launched with scoop and inlet tube 14 which open to flood electrolyte compartment 13 and thereby activate the battery. Seawater, acting under ram pressure, is admitted to scoop tube 14. This provides a continuous seawater flow through the battery compartment and out through exhaust aperture 16 under the forward motion of the torpedo. The seawater flows at a predetermined rate, in accordance with the torpedo speed and size of inlet. (In situations in which the flow was varied by regulator valve or recirculation control, the seawater flow rate varies in a predetermined manner.) From the inlet tube, it flows through the diffusion passage 46 and then into inlet manifold cavity 44 as a continuous turbulent stream. The manifold cavity 44 introduces the seawater into the transverse spaces 25 along row 24 of electrode plate units.

Figure 7:
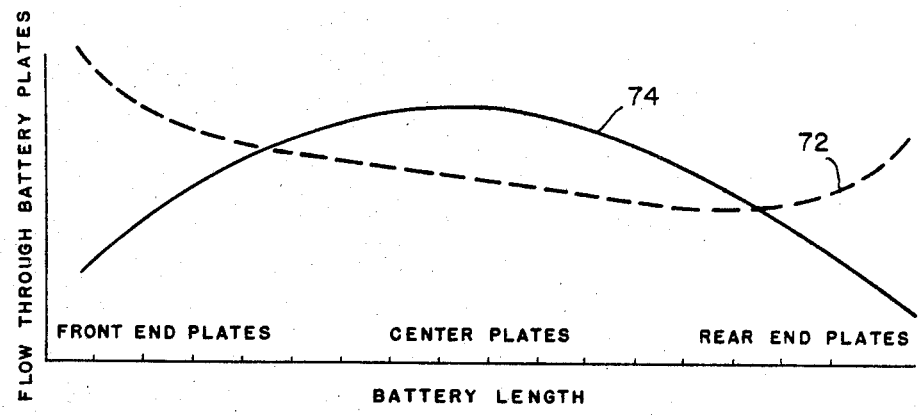
FIG. 7 is a graph depicting the effect of masking strips on the flow distribution through spaces between the battery plates.

The importance of sets of masking strips 60, 62, 64 and 66 can be best understood by first considering the situation for the case in which they are omitted. Dashed curve 72, FIG. 7, represents the flow distribution through spaces 25 along the length of the battery for the case where sets of masking strips 60, 62, 64 and 66 are omitted. (Note that this is not the case of the presently disclosed invention.) Flows at the ends of the battery are higher than the flow at the center. While not fully understood, it is believed that this phenomenon is due to increased pressure differences caused by location of a low pressure point at exhaust aperture 16 at the front end of the battery, and due to the "blind" rear ends of cavities 44 and 48 causing a high pressure differential across the rear end. This case of higher flow rates through spaces 25 at the ends of the battery results in operation of plate units 22 in the end zones at cooler temperatures than those in the middle. Also, the presence of aluminum bus plates 34a and 34b causes heat sink effects at the end zones, which further lowers the temperature. The cooler operation of these end sections causes slower consumption of the battery material, and therefore the active material of these plates is not effectively expended during the battery run. It also causes a parasitic electric drain from the middle zone. The cooler operating plate units deliver lower voltages and edge leakage currents flow from the middle to the end zones.

Referring now to the situation of the present disclosed invention, the presence of masking strip sets 60, 62, 64 and 66 change the flow distribution through spaces 25 along the battery length. The individual strips obstruct passage area through the spaces 25 which they overlay, and are shaped to decrease in obstruction area in the directions away from the respective end at which located. This causes the center electrode units 22 to receive more flow than those at the ends. Solid line curve 74 represents the flow distribution through spaces 25 along the length of the battery in the presence of masking strip sets 60, 62, 64 and 66. This causes the end cells to run warmer which in turn achieves greater utilization of the active plate materials in the end zones, and overcomes edge leakage. The precise shaping of the masking strips is done by trial and error experiments to ascertain an optimum flow distribution. Another factor in the shaping is to avoid "shadow effects" where the size of the masking strip would cause underlying flow stagnation. Such stagnation, in turn, results in non-utilization of the local active battery material. The tapered and pointed shape of the masking strips has been found an effective construction for avoiding these "shadow effects."

An important feature of the invention is that the locally applied longitudinally extending and tapered masking strips cause the desired flow distribution of curve 74 without complicating the fluid dynamics within the electrolyte distribution system. Stated another way, their presence is only felt across the spaces 25 they are intended to influence, and they do not cause undesired effects in the manifold cavities and inlet passages.

Another important feature of the invention is that the tapered masking strip construction has been found to operate linearly under variation in flow rate through the electrolyte distribution system. Thus, the structure of sets of strips 60, 62, 64 and 66 causes the same shape of flow distribution curve (as curve 74) irrespective of the flow volume. The importance of this lies in its enabling optimization of battery material utilization by a combination of the approach of control of the distribution of electrolyte along the battery length and the approach of varying flow rate during cycle of operation.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalities thereon or therefor.

What is claimed is:

1. In a seawater battery for torpedo propulsion of the type including:
   (i) a longitudinal row of vertically extending, parallel spaced, electrode plate units, said units each comprising integrally joined positive and negative flat plate elements with a conductor sheet therebetween, the positive and negative elements of all the units of the row being uniformly disposed in the direction of one and the other, respectively, of opposite ends of the row so that opposite polarities of plate elements confront each other across the spaces between the units,
   (ii) a seawater inlet manifold cavity extending along the lower edges of the row of electrode plate units for introducing a flow of seawater to the lower ends of the spaces between adjacent units, said inlet manifold cavity adapted for connection to a seawater supply line at a predetermined one of the opposite ends of of the row, and
   (iii) a seawater outlet manifold cavity extending along the upper edges of the row of electrode plate units, said outlet manifold cavity forming an outlet zone for receiving the flow of seawater from the upper ends of the spaces between adjacent units, said outlet passage cavity adapted for connection to a seawater exhaust port, the improvements in combination, comprising;
  (a) first, second, third, and fourth longitudinally varying partial flow obstructions for partially obstructing the seawater flow through the spaces between adjacent electrode plate units,
  (b) the first, second, third and fourth longitudinally varying partial flow obstructions each having a total longitudinal expanse less than one quarter the length of the row of electrode plate units,
  (c) the first and second longitudinally varying flow obstructions being disposed in the inlet manifold cavity over the lower edges of the electrode plate units and adjoining one and the other ends of the row, respectively,
  (d) the third and fourth longitudinally varying flow obstructions being disposed in the outlet manifold cavity over the upper edges of the electrode plate units and adjoining one and the other ends of the row, respectively, and
  (e) the first, second, third and fourth longitudinally varying partial flow obstructions each being so constructed to obstruct a decreasing proportion of space between adjacent electrode units in the longitudinal direction away from the respective adjoining end of the row and toward the middle of the row of plate units.

2. Apparatus in accordance with claim 1, the improvements being further characterized by;
  (f) said first, second, third, and fourth longitudinally varying partial flow obstructions each comprising a set of laterally spaced tapered masking strips, each tapered masking strip of a set having a pointed end and a non-pointed end and being disposed with its non-pointed end adjoining the end of the row of plate units and its pointed end extending toward the middle of the row.

3. Apparatus in accordance with claim 2, the improvements being further characterized by;
  (g) said first, second, third and fourth longitudinally varying partial flow obstructions having equal longitudinal expanses, but with the first and second partial flow obstructions being wider than the third and fourth partial flow obstructions.

4. Apparatus in accordance with claim 3, the improvements being further characterized by;
  (h) each of said sets comprising at least four laterally spaced tapered masking strips, the middle two of the masking strips of each set being longer and covering more space between adjacent electrode units than the remaining two masking strips.

References Cited

UNITED STATES PATENTS

| 3,012,087 | 12/1961 | Billiard et al. | |
| 3,257,241 | 6/1966 | Tamminen | 136—160 |
| 3,388,003 | 6/1968 | Jackley | 136—100 |

WINSTON A. DOUGLAS, Primary Examiner

C. F. LEFEVOUR, Assistant Examiner

U.S. Cl. X.R.

136—90